Patented June 28, 1932

1,864,826

UNITED STATES PATENT OFFICE

DAVID L. JACOBSON, OF PITTSBURGH, PENNSYLVANIA, ASSIGNOR TO THE KOPPERS COMPANY, A CORPORATION OF DELAWARE

PROCESS FOR MANUFACTURING NITRATES AND OTHER PRODUCTS

Application filed October 10, 1929. Serial No. 398,639.

This invention relates to processes of manufacturing alkali nitrates and other products.

An object of the present invention is to provide an efficient process and means for preparing nitrates and other products and to produce the same at a relatively low cost.

Any of the alkali nitrates including sodium and potassium may be prepared by the present process by first forming a bicarbonate from the corresponding alkali chloride or other alkali compound such as alkali thiocyanate, and converting the bicarbonate into the nitrate. Carbon dioxide and ammonia are used to convert the chloride to the bicarbonate. By the addition of nitric acid to the bicarbonate to obtain the nitrate, the carbon dioxide in pure form is again obtained and may be reused in converting the chloride to the bicarbonate.

Recycling of this carbon dioxide gas is particularly desirable since it is substantially pure, and also since it is an incidental product of the present process. It is easily seen that there is a saving here in operating expenses due to the fact that it is not necessary to calcine the above-mentioned bicarbonate in order to obtain carbon dioxide.

Ammonium chloride is obtained as a by-product in pure form or it may be treated to produce ammonia which may be reused in the process.

Nitric acid used in the present process may be derived from any source. It is preferred, however, to use nitric acid which is obtained in the oxidation of ammonia.

If desired, a readily soluble auxiliary salt of an acid other than hydrochloric and carbonic acids may be used along with the alkali chloride as, for instance, ammonium nitrate or ammonium sulphate, in the manner described below.

Figure 1:
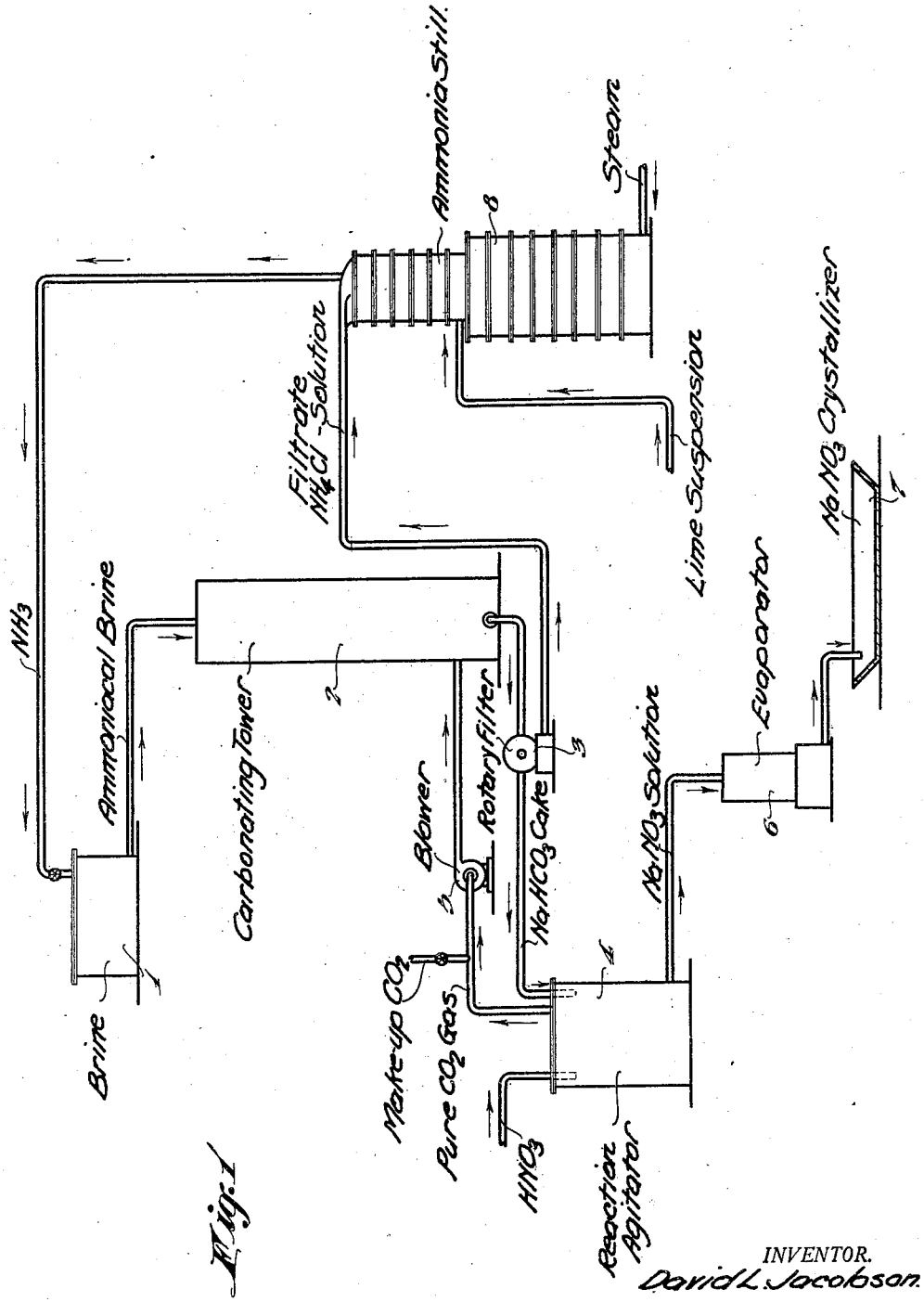
Figure 2:
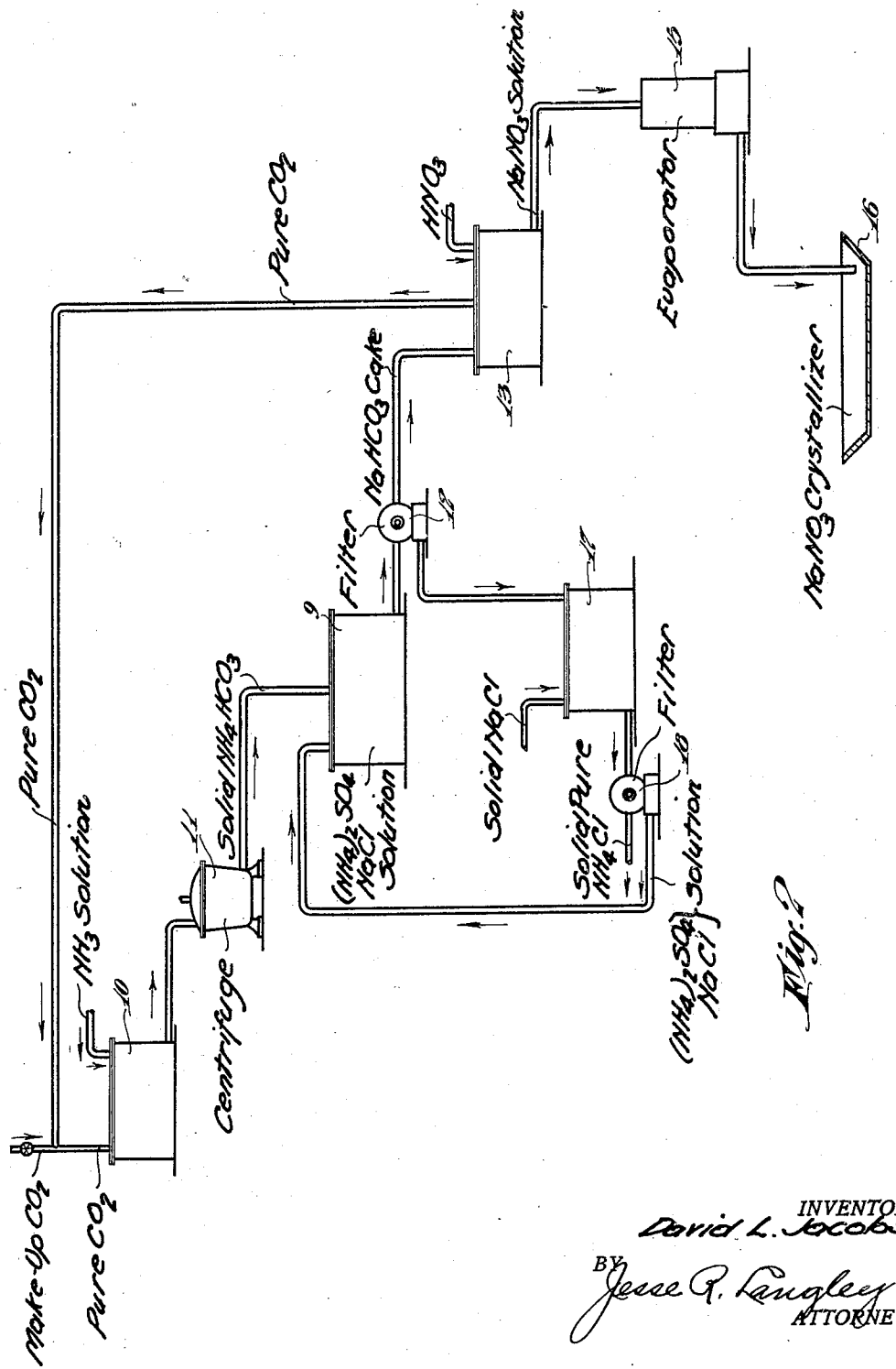
Figure 3:
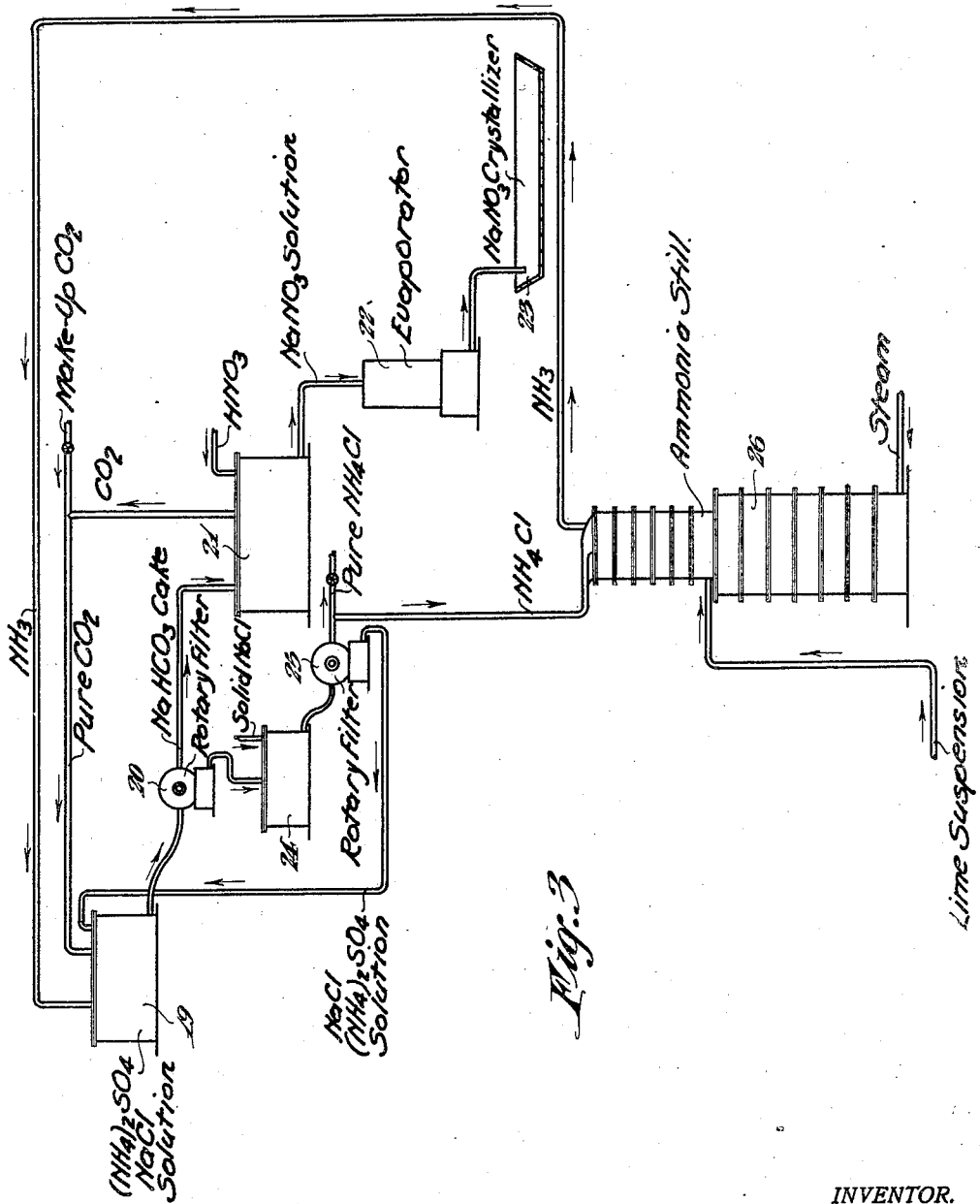

The process of the present invention may be carried out in the manner illustrated in the accompanying drawings in which Figs. 1, 2 and 3 represent various modifications of apparatus which may be used.

The following examples are given to illustrate the manner in which the present process may be carried out:

*Example 1.*—A sodium chloride solution, preferably saturated or in the form of a brine, may be charged with ammonia from any suitable source and then treated with carbon dioxide in any desired way. It is preferable to use enough ammonia and carbon dioxide to convert substantially all of the sodium chloride to sodium bicarbonate. Ammonium chloride is also formed in this reaction and remains in solution while the sodium bicarbonate is precipitated. The sodium bicarbonate is separated from the solution by filtration or centrifugalization. The bicarbonate may then be washed with water to remove as much of the adhering sodium and ammonium chlorides as possible. The ammonium chloride solution is treated with lime to produce ammonia which is used for the production of more sodium bicarbonate.

The sodium bicarbonate is treated with nitric acid to form sodium nitrate and carbon dioxide. The carbon dioxide obtained in this reaction is recovered and used for the production of additional sodium bicarbonate.

The principal steps in the process may be illustrated by the following equations:

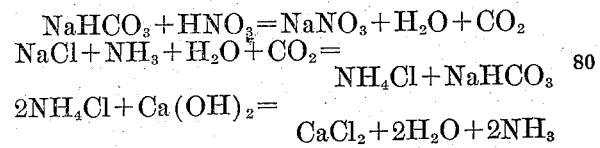

$$NaHCO_3 + HNO_3 = NaNO_3 + H_2O + CO_2$$
$$NaCl + NH_3 + H_2O + CO_2 = NH_4Cl + NaHCO_3$$
$$2NH_4Cl + Ca(OH)_2 = CaCl_2 + 2H_2O + 2NH_3$$

The sodium nitrate is recovered by evaporation of the sodium nitrate solution obtained above and by crystallization. If desired, ammonium chloride may also be recovered as an intermediate product.

Potassium nitrate may be obtained in the same way that sodium nitrate is obtained simply by substituting potassium chloride and potassium bicarbonate for sodium chloride and sodium bicarbonate respectively in the above reactions.

The process set forth in the foregoing example may be carried on in an apparatus similar to that shown in Fig. 1. A brine or concentrated solution containing alkali chloride is placed in tank 1 and charged with ammonia gas. The resulting ammoniacal brine is run down into a carbonating tower 2 and is treated with carbon dioxide gas. Sodium bicarbonate is thereby formed and passes out with the ammoniacal liquor into a rotary filter 3. The sodium bicarbonate cake from the filter is transferred to a tank 4 and is there treated with nitric acid while agitating it. Pure carbon dioxide gas comes off and by means of a blower 5 is forced into the carbonating tower 2. Sodium nitrate solution from the tank 4 is passed into an evaporator 6 to remove most of the water. The resulting concentrated nitrate solution is then passed into a pan 7 in which the sodium nitrate crystallizes out.

The filtrate from the filter 3 containing ammonium chloride is pumped to an ammonia still 8 having attached thereto the usual lime-leg. The ammonia from the still is employed in charging the brine in the tank 1.

*Example 2.*—A concentrated ammonium sulphate sodium chloride solution is prepared and treated with carbon dioxide and ammonia gas. Alternatively, pure carbon dioxide may be bubbled through a strong ammonia solution to precipitate ammonium bicarbonate which may be separated from the solution and added to the ammonium sulphate-sodium chloride solution. The sodium chloride in each case is converted to sodium bicarbonate which is treated with nitric acid to produce sodium nitrate, and the carbon dioxide thus formed is used for the treatment of additional sodium chloride.

After the sodium chloride in the above sodium chloride-ammonium sulphate solution has been substantially entirely converted into sodium bicarbonate and after the sodium bicarbonate has been separated from the resulting solution, the latter is treated with solid sodium chloride whereupon the ammonium chloride precipitates out and is separated by filtration or otherwise. The ammonium chloride thus obtained may be purified for any desired purpose or it may be used for generating additional ammonia gas.

The process set forth in Example 2 may be carried out in apparatus similar to those shown in Figs. 2 and 3.

As shown in Fig. 2, a concentrated ammonium sulphate-sodium chloride solution is placed in a tank 9 and is treated with solid ammonium bicarbonate. The ammonium bicarbonate is previously prepared in a tank 10 by charging an ammonia solution in the said tank with pure carbon dioxide. The solid ammonium bicarbonate is separated out by means of a centrifuge 11 or other suitable apparatus and then passed into the tank 9.

Sodium bicarbonate formed in the tank 9 is separated from the ammoniacal liquor by means of a filter 12 and the sodium bicarbonate cake thus obtained is transferred to a tank 13, where it is treated with nitric acid. The carbon dioxide formed in the tank 13 is passed into the tank 10 to charge the ammonia solution. The sodium nitrate solution from the tank 13 is passed to an evaporator 15 and thence to a pan 16 in which the nitrate crystallizes out.

The ammoniacal liquor from the filter 12 is passed into a tank 17 and is there treated with solid sodium chloride and the ammonium chloride formed is separated from the ammonium sulphate-sodium chloride solution by means of a filter 18.

The latter solution is pumped into the tank 9 and is there treated with ammonium bicarbonate to form additional sodium bicarbonate.

As shown in Fig. 3, a saturated or concentrated ammonium sulphate-sodium chloride solution is treated in a tank 19 with ammonia gas and carbon dioxide. The sodium bicarbonate formed is separated from the ammoniacal solution by means of a filter 20 and the sodium bicarbonate cake is passed into a tank 21 wherein it is treated with nitric acid. The carbon dioxide generated in the tank 21 is passed into the tank 19. The sodium nitrate solution from the tank 21 is passed into an evaporator 22 and thence to a pan 23 in which sodium nitrate crystallizes out. The filtrate from the filter 20 passes into a tank 24 in which it is treated with solid sodium chloride. Ammonium chloride is separated out by means of a rotary filter 25 and may be purified, for use in other processes, or it may be passed into an ammonia still 26 where it is treated with lime to generate ammonia which is passed into the tank 19.

The filtrate from the filter 25 containing sodium chloride and ammonium sulphate is passed into the tank 19 to be acted on by the ammonia from the still 26 and the carbon dioxide from the tank 21.

In each of the arrangements shown, namely, in Figs. 1, 2 and 3, means may be provided for passing into the carbon dioxide circuit, make-up carbon dioxide from any desirable source.

One of the principal advantages of the present process is the increased efficiency of the ammonia-soda reaction due to the use of pure carbon dioxide. The use of the carbon dioxide in a cyclic manner eliminates the necessity of providing separate means for generating the same, as is usually required in an ammonia-soda plant. The small amount of carbon dioxide needed for make-up may be supplied in any known way.

I claim as my invention:

1. A process comprising treating an alkali chloride solution with carbon dioxide and ammonia to form an alkali bicarbonate, removing the alkali bicarbonate thus formed, from the solution, treating the said bicarbonate with nitric acid to form an alkali nitrate and carbon dioxide and treating additional alkali chloride with the latter carbon dioxide.

2. A process comprising treating an alkali chloride solution with carbon dioxide and ammonia to form an alkali bicarbonate and ammonium chloride, separating the bicarbonate from the ammonium chloride thus formed, treating the said bicarbonate with nitric acid to form an alkali nitrate and carbon dioxide, treating the said ammonium chloride with lime to form ammonia, and treating additional alkali chloride with the said carbon dioxide and ammonia formed in the aforegoing reactions.

3. A process comprising charging an alkali chloride solution with ammonia, passing the ammoniacal brine thus formed into a countercurrent of carbon dioxide gas to form a precipitate of alkali bicarbonate and a solution of ammonium chloride, filtering the said ammonium chloride solution to remove the said bicarbonate, treating the said bicarbonate with nitric acid to form an alkali nitrate and carbon dioxide, treating the said ammonium chloride with lime to form ammonia, and treating additional alkali chloride with the said carbon dioxide from the said bicarbonate and with the said ammonia from the said ammonium chloride.

4. A process comprising treating a solution containing an alkali chloride and an ammonium salt other than a chloride or a carbonate with ammonia and carbon dioxide to form an alkali bicarbonate, separating the said bicarbonate from the resulting ammoniacal liquor, adding alkali chloride to the said ammoniacal liquor to precipitate ammonium chloride, separating the ammonium chloride from the said liquor, treating the said ammonium chloride with lime to form ammonia, treating the said bicarbonate with nitric acid to form alkali nitrate and carbon dioxide, and treating additional alkali chloride solution with the said ammonia and carbon dioxide from the lime and nitric acid reactions respectively.

5. A process comprising treating a solution containing ammonium sulphate and alkali chloride with ammonium bicarbonate to form alkali bicarbonate, separating the said alkali bicarbonate from the resulting ammoniacal liquor, treating the said alkali bicarbonate with nitric acid to form alkali nitrate and carbon dioxide, treating the said ammoniacal liquor with alkali chloride to form ammonium chloride and additional solution of ammonium sulphate and alkali chloride, treating the said ammonium chloride with lime to form ammonia, and treating the said additional solution of ammonium sulphate and alkali chloride with the said carbon dioxide and ammonia from the nitric acid and lime reaction respectively.

6. A process comprising treating a solution containing an alkali chloride and an ammonium salt other than a chloride or a carbonate with ammonia and carbon dioxide to form an alkali bicarbonate, separating the said bicarbonate from the resulting ammoniacal liquor, adding alkali chloride to the said ammoniacal liquor to precipitate ammonium chloride, separating ammonium chloride from the said liquor, treating the said bicarbonate with nitric acid to form alkali nitrate and carbon dioxide, and treating additional alkali chloride solution with ammonia and with the said carbon dioxide from the nitric acid reaction.

7. A process comprising treating a solution containing an alkali chloride and an ammonium salt other than a chloride or a carbonate with ammonium bicarbonate to form alkali bicarbonate, separating the said alkali bicarbonate from the resulting ammoniacal liquor, treating the said alkali bicarbonate with nitric acid to form alkali nitrate and carbon dioxide, treating the said ammoniacal liquor with alkali chloride to form ammonium chloride, separating ammonium chloride from the liquor, treating the said carbon dioxide with ammonia solution to form ammonium bicarbonate, and adding the said ammonium bicarbonate to the said ammoniacal liquor after treatment thereof with alkali chloride to form additional alkali bicarbonate.

8. A process comprising the steps of treating an alkali bicarbonate with nitric acid to form alkali nitrate and carbon dioxide, treating ammonium hydroxide solution with carbon dioxide including the said carbon dioxide from the nitric acid reaction, to form ammonium bicarbonate; treating a solution containing an alkali metal compound with the said ammonium bicarbonate to produce additional alkali bicarbonate; and treating the resulting alkali bicarbonate with nitric acid to produce alkali nitrate.

9. A process comprising the steps of treating an alkali bicarbonate with nitric acid to form alkali nitrate and carbon dioxide, treating a solution of an alkali metal compound with ammonia gas and with the said carbon dioxide to produce additional bicarbonate, and treating the resulting bicarbonate with nitric acid to produce alkali nitrate.

In testimony whereof, I have hereunto subscribed my name this 8th day of October, 1929.

DAVID L. JACOBSON.